US012240071B2

(12) United States Patent
Chen et al.

(10) Patent No.: US 12,240,071 B2
(45) Date of Patent: Mar. 4, 2025

(54) FIVE-AXIS VERTICAL PROCESSING SYSTEM FOR AUTOMATIC LOADING AND UNLOADING

(71) Applicant: KEDE NUMERICAL CONTROL CO., LTD., Liaoning (CN)

(72) Inventors: Hu Chen, Liaoning (CN); Jian Zhang, Liaoning (CN); Lianyang Wang, Liaoning (CN); Changlin Du, Liaoning (CN); Haibo Zhang, Liaoning (CN); Yapeng Li, Liaoning (CN); Zidan Ju, Liaoning (CN); Shengfeng Yu, Liaoning (CN); Mingshan Song, Liaoning (CN); Feng Wang, Liaoning (CN); Yinghua Li, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 335 days.

(21) Appl. No.: 17/632,910

(22) PCT Filed: Aug. 14, 2020

(86) PCT No.: PCT/CN2020/109115
§ 371 (c)(1),
(2) Date: Feb. 4, 2022

(87) PCT Pub. No.: WO2021/031993
PCT Pub. Date: Feb. 25, 2021

(65) Prior Publication Data
US 2022/0274219 A1    Sep. 1, 2022

(30) Foreign Application Priority Data
Aug. 16, 2019    (CN) .......................... 201910760772.8

(51) Int. Cl.
*B23Q 1/66*    (2006.01)
*B23Q 1/62*    (2006.01)
(Continued)

(52) U.S. Cl.
CPC ............... *B23Q 1/66* (2013.01); *B23Q 1/621* (2013.01); *B23Q 5/34* (2013.01); *B23Q 7/04* (2013.01);
(Continued)

(58) Field of Classification Search
CPC . B23Q 1/66; B23Q 7/045; B23Q 7/04–7/048; B23Q 7/1494; Y10T 29/5196; Y10T 409/30532; Y10T 409/306048
(Continued)

(56) References Cited

U.S. PATENT DOCUMENTS

| 6,394,892 B2 * | 5/2002 | Hanisch | B24B 41/062 451/177 |
| 2010/0313718 A1 * | 12/2010 | Meidar | B23Q 1/015 82/122 |
| 2013/0210594 A1 * | 8/2013 | Schuster | B23Q 1/4852 483/22 |

FOREIGN PATENT DOCUMENTS

DE    10336156 A1 *    3/2005

OTHER PUBLICATIONS

Machine translation of DE 10336156 A1, which DE '156 was published Mar. 24, 2005.*

* cited by examiner

*Primary Examiner* — Erica E Cadugan
(74) *Attorney, Agent, or Firm* — Muncy, Geissler, Olds & Lowe, P.C.

(57) ABSTRACT

The present invention discloses a five-axis vertical machining system with automatic loading and unloading, including a feeding mechanism, a loading mechanism, and a numerical
(Continued)

control machine tool. The feeding mechanism is arranged in front of a ram assembly, and the feeding mechanism drives a raw material to move along an X axis and/or a Y axis of the numerical control machine tool; the loading mechanism is fixed on the ram assembly; and the loading mechanism moves along a Z axis of the numerical control machine tool to drive the raw material onto a cradle assembly of the numerical control machine tool. The present invention realizes an automatic loading and unloading function by setting a feeding mechanism capable of automatic feeding and a loading mechanism with automatic loading to cooperate with each other, thereby improving the working efficiency and saving manpower.

5 Claims, 7 Drawing Sheets

(51) Int. Cl.
*B23Q 5/34* (2006.01)
*B23Q 7/04* (2006.01)
*B23C 1/00* (2006.01)
*B23C 1/06* (2006.01)

(52) U.S. Cl.
CPC .............. *B23Q 7/045* (2013.01); *B23C 1/002* (2013.01); *B23C 1/06* (2013.01); *B23Q 2230/002* (2013.01); *Y10T 409/306048* (2015.01); *Y10T 409/308288* (2015.01)

(58) Field of Classification Search
USPC .................................. 29/33 P; 409/159, 172
See application file for complete search history.

Miniature Cylinder Arranged Below the
First Pallet Group to Drive the First
Pallet Group to Slide Along the Y Axis 1-15

Fig. 7

Miniature Cylinder Arranged Below the Second Pallet Group to Drive the First Pallet Group to Slide Along the Y Axis    1-16

Fig. 8

FIVE-AXIS VERTICAL PROCESSING SYSTEM FOR AUTOMATIC LOADING AND UNLOADING

TECHNICAL FIELD

The present invention relates to the field of machine tools, particularly, to a five-axis vertical machining system with automatic loading and unloading.

BACKGROUND ART

With the increase of social demand, traditional manpower can no longer meet the supply demand of the society. In the process of machine tool processing, the traditional method is to manually clamp a raw material of a workpiece through a turntable, and then process the raw material of the workpiece. After the processing is completed, the processed raw material of the workpiece is manually removed. During this process, the machine tool stops for too long and cannot work continuously, resulting in a serious reduction in production efficiency and workpiece machining accuracy, and manual operation may cause problems such as mechanical damage and personal injury.

SUMMARY OF INVENTION

The present invention provides a five-axis vertical machining system with automatic loading and unloading to overcome the above technical problems.

The present invention includes a feeding mechanism, a loading mechanism, and a numerical control machine tool; the feeding mechanism is arranged in front of a ram assembly, and the feeding mechanism drives a raw material to move along an X axis and/or a Y axis of the numerical control machine tool; the loading mechanism is fixed on the ram assembly; and the loading mechanism moves along a Z axis of the numerical control machine tool to drive the raw material onto a cradle assembly of the numerical control machine tool.

Further, the loading mechanism includes an electric motor, a mounting plate, a piston cylinder, a piston rod and a clamping device;

the piston cylinder is fixed on the mounting plate, the mounting plate is arranged on the ram assembly, and an output end of the electric motor faces downward and is connected to an input end of the piston cylinder; and another end of the piston rod is fixedly connected to the clamping device, and a top portion of the clamping device is connected to a bottom portion of a transition plate.

Further, the machining system also includes a linear bearing, a fixed plate, and a transition plate;

the fixed plate is fixed on the mounting plate, the linear bearings are arranged in circular tracks on both sides of the fixed plate, bottom ends of the linear bearings are connected to a top portion of the transition plate, and the piston rod moves in a through hole between the circular tracks on both sides of the fixed plate.

Further, the feeding mechanism includes a base, a connecting plate, a first pallet group, a driving device, and a linkage mechanism;

the base is provided with the connecting plate, and the connecting plate is slidably provided thereon with the first pallet group; the driving device is a cylinder, the cylinder is provided on a bottom portion of the base, the linkage mechanism is a guide rail and a slider, the slider is arranged on a bottom portion of the connecting plate, and the guide rail is arranged on the base; the slider moves on the guide rail; and the cylinder drives the linkage mechanism, and drives the connecting plate and the first pallet group above to move along the X axis of the numerical control machine tool, the first pallet group is arranged on the connecting plate, a miniature cylinder is arranged below the first pallet group, and the miniature cylinder drives the first pallet group to slide along the Y axis of the numerical control machine tool.

Further, the machining system also includes a second pallet group; the second pallet group is arranged on the connecting plate, a miniature cylinder is arranged below the second pallet group, and the miniature cylinder drives the second pallet group to slide along the Y axis of the numerical control machine tool.

The present invention realizes an automatic loading and unloading function by setting a feeding mechanism capable of automatic feeding and a loading mechanism with automatic loading to cooperate with each other, thereby improving the working efficiency and the machining accuracy of parts, and saving manpower.

BRIEF DESCRIPTION OF DRAWINGS

In order to illustrate the embodiments of the present invention or the technical solutions in the prior art more clearly, the following briefly introduces the accompanying drawings that need to be used in the description of the embodiments or the prior art. Obviously, the accompanying drawings in the following description are some embodiments of the present invention, and for a person skilled in the art, other drawings can also be obtained from these accompanying drawings without creative effort.

FIG. 7 is a schematic of a miniature cylinder for driving the first pallet group to move along the Y-axis.

FIG. 8 is a schematic of a miniature cylinder for driving the second pallet group to move along the Y-axis.

DESCRIPTION OF EMBODIMENTS

In order to make the purposes, technical solutions and advantages of the embodiments of the present invention clearer, the technical solutions in the embodiments of the present invention will be clearly and completely described below with reference to the accompanying drawings in the embodiments of the present invention. Obviously, the embodiments to be described are some, but not all, embodiments of the present invention. Based on the embodiments of the present invention, all other embodiments obtained by a person skilled in the art without creative efforts are within the protection scope of the present invention.

The numerical control machine tool 3 of the present invention includes a ram assembly 3-2, a carriage assembly 3-3, a slide table assembly 3-4, a turntable assembly, a cradle assembly 3-5 and a machine tool 3-6, each of which is installed based on the existing layout of the numerical control machine tool.

The present invention includes a feeding mechanism 1, a loading mechanism 2, and a numerical control machine tool 3;

the feeding mechanism 1 is arranged in front of a ram assembly 3-2, and the feeding mechanism 1 drives a raw material 5 to move along an X axis and/or a Y axis of the numerical control machine tool 3; the loading mechanism 2 is fixed on the ram assembly 3-2; and the loading mechanism 2 moves along a Z axis of the numerical control machine tool 3 to drive the raw material 5 to a cradle assembly 3-5 of the numerical control machine tool.

Further, the loading mechanism 2 includes an electric motor 2-1, a mounting plate 2-2, a piston cylinder 2-3, a piston rod 2-6 and a clamping device 2-8;

the piston cylinder 2-3 is fixed on the mounting plate 2-2, the mounting plate 2-2 is arranged on the ram assembly 3-2, and an output end of the electric motor 2-1 faces downward and is connected to an input end of the piston cylinder 2-3; and another end of the piston rod 2-6 is fixedly connected to the clamping device 2-8, and a top portion of the clamping device 2-8 is connected to a bottom portion of a transition plate 2-7.

Further, the machining system also includes a linear bearing 2-4, a fixed plate 2-5, and a transition plate 2-7;

the fixed plate 2-5 is fixed on the mounting plate 2-2, the linear bearings 2-4 are arranged in circular tracks on both sides of the fixed plate 2-5, bottom ends of the linear bearings 2-4 are connected to a top portion of the transition plate 2-7, and the piston rod 2-6 moves in a through hole between the circular tracks on both sides of the fixed plate 2-5.

Figure 1:
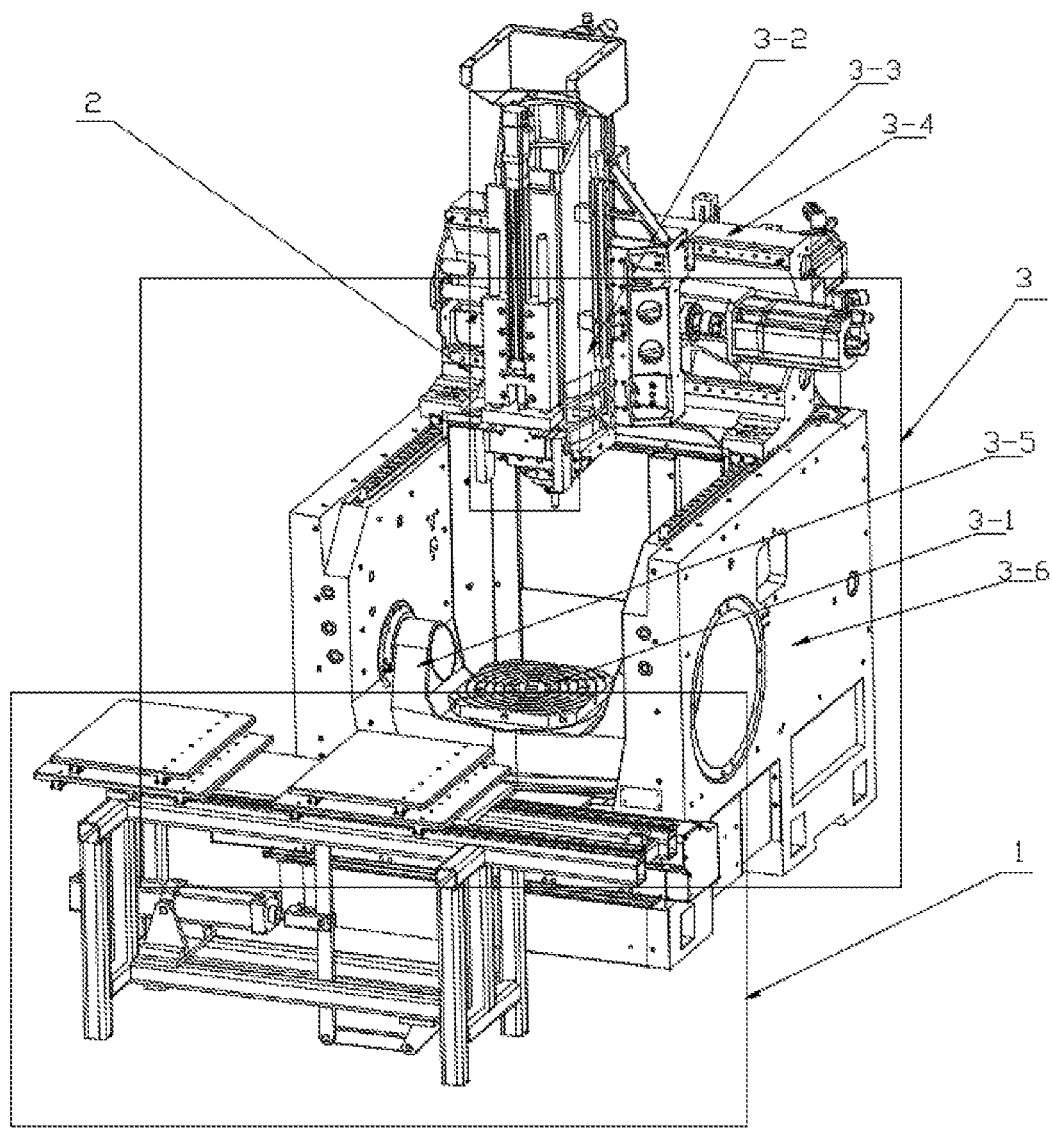
FIG. 1 is the overall structure schematic diagram of the initial state of the present invention.
Figure 4:
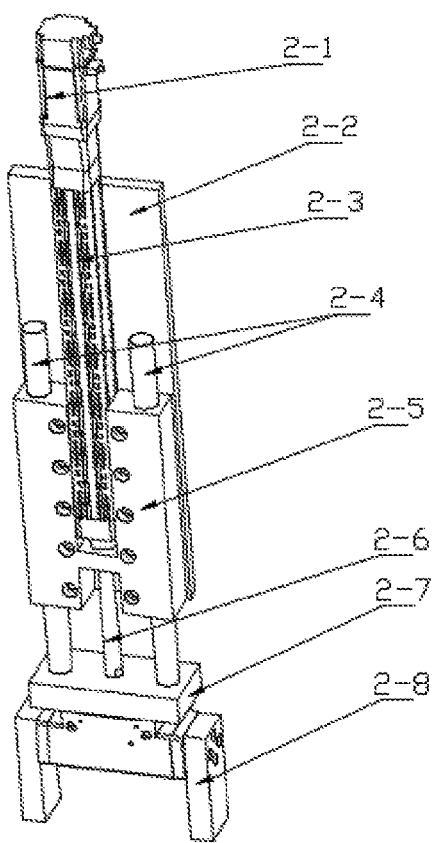
FIG. 4 is the overall structure schematic diagram of the loading mechanism of the present invention.

Specifically, the feeding mechanism 1 is arranged in front of a ram assembly 3-2, and the feeding mechanism 1 drives a raw material 5 to move along an X axis and a Y axis of the numerical control machine tool 3; the loading mechanism 2 is fixed on the ram assembly 3-2; and the loading mechanism 2 moves along a Z axis of the numerical control machine tool 3 to drive the raw material 5 to a cradle assembly 3-5 of the numerical control machine tool for processing; as illustrated by FIG. 1 and FIG. 4, the loading mechanism includes the electric motor 2-1, the mounting plate 2-2, the piston cylinder 2-3, the linear bearings 2-4, the fixed plate 2-5, the piston rod 2-6, the transition plate 2-7 and the clamping device 2-8;

the piston cylinder 2-3 is fixed on the mounting plate 2-2, an output end of the electric motor 2-1 faces downward and is connected to an input end of the piston cylinder 2-3, and the electric motor 2-1 is used to drive the piston cylinder 2-3; another end of the piston rod 2-6 is fixedly connected to the clamping device 2-8, and a top portion of the clamping device 2-8 is connected to a bottom portion of the transition plate 2-7; and the fixed plate 2-5 is fixed on the mounting plate 2-2, the linear bearings 2-4 are two bearings arranged respectively in circular tracks on both sides of the fixed plate 2-5, bottom ends of the two linear bearings 2-4 are connected to a top portion of the transition plate 2-7, and the piston rod 2-6 moves in a through hole between the circular tracks on both sides of the fixed plate 2-5. The cooperation of the linear bearings 2-4, the fixing plate 2-5 and the transition plate 2-7 effectively prevents pneumatic fingers from shaking during the movement.

Further, the feeding mechanism 1 includes a base 1-1, a connecting plate 1-2, a first pallet group 1-3, a driving device, and a linkage mechanism;

the base 1-1 is provided with the connecting plate 1-2, and the connecting plate 1-2 is slidably provided thereon with the first pallet group 1-3; the driving device is a cylinder 1-14, the cylinder 1-14 is provided on a bottom portion of the base 1-1, the linkage mechanism is a guide rail 1-7 and a slider 1-6, the slider 1-6 is arranged on a bottom portion of the connecting plate 1-2, and the guide rail 1-7 is arranged on the base 1-1; the slider 1-6 moves on the guide rail 1-7; and the cylinder 1-14 drives the slider mechanism 1-6, and drives the connecting plate 1-2 and the first pallet group 1-3 above to move along the X axis of the numerical control machine tool 3, the first pallet group 1-3 is arranged on the connecting plate 1-2, a miniature cylinder 1-15, schematically depicted in FIG. 7, is arranged below the first pallet group 1-3, and the miniature cylinder 1-15 drives the first pallet group 1-3 to slide along the Y axis of the numerical control machine tool 3.

Further, the machining system also includes a second pallet group 1-4; the second pallet group 1-4 is arranged on the connecting plate 1-2, a miniature cylinder 1-16, schematically depicted in FIG. 8, is arranged below the second pallet group 1-4, and the miniature cylinder 1-16 drives the second pallet group 1-4 to slide along the Y axis of the numerical control machine tool 3.

Figure 6:
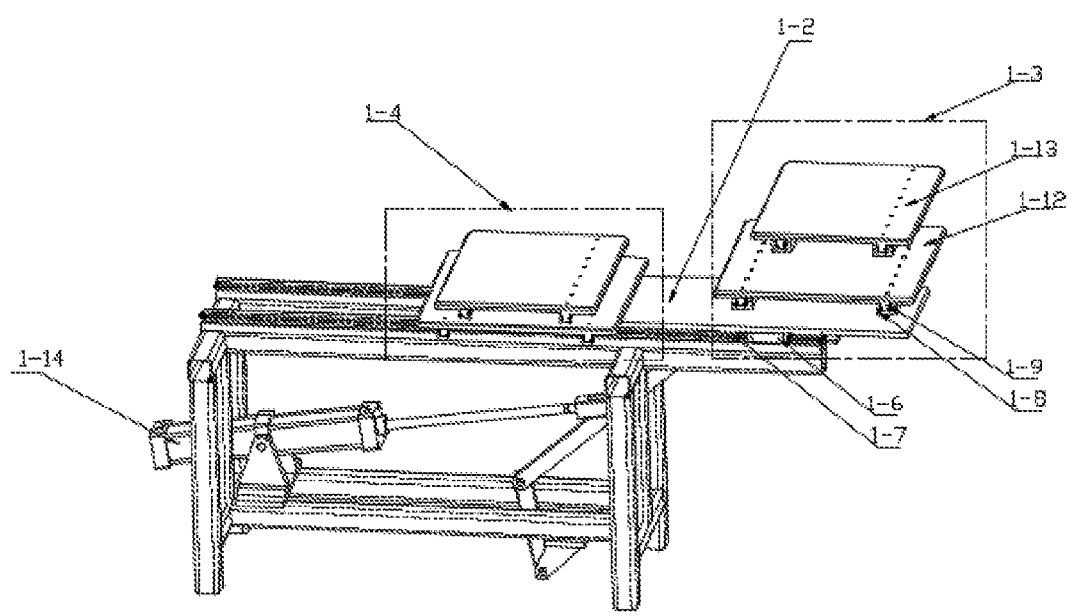
FIG. 6 is the structure schematic diagram of the working state of the feeding mechanism of the present invention.

Specifically, as shown in FIG. 6, the number of pallets in the first pallet group 1-3 described in this embodiment is not limited to one, and may be multiple. When there are two, a first slider 1-9 is arranged below the first pallet 1-12, the first slider 1-9 slides on a first guide rail 1-8 arranged on the connecting plate 1-2, the slider 1-6 is arranged below the connecting plate 1-2, the slider 1-6 slides on the guide rail 1-7 arranged on the base, the driving device is the cylinder 1-14, the cylinder 1-14 is arranged on the bottom portion of the base 1-1, the linkage mechanism is the guide rail 1-6 and the slider 1-7, the cylinder 1-14 drives the linkage mechanism 1-6 to cause the connecting plate 1-2 above to move along the X axis of the numerical control machine tool 3;

the slider 1-6 moves along the X axis of the numerical control machine tool 3, the first slider 1-9 moves along the Y axis of the numerical control machine tool 3, the fixed form of the second pallet 1-13 is the same as that of the first pallet 1-12, and the movement direction of the second pallet 1-13 is the same as that of the first pallet, miniature cylinders are provided below the first pallet 1-12 and the second pallet 1-13 to respectively drive the slider (refer to the working process of the miniature cylinder described in the published document CN207982665U, which is not repeated in this application) to send the raw material 5 on the second pallet to the cradle assembly 3-5 of the numerical control machine tool for processing; the structure and installation method of the second pallet group 1-4 are the same as those of the first pallet group; and the setting of the feeding mechanism realizes the function of automatic loading and unloading, which makes the processing of the raw material 5 more convenient in the numerical control machine tool and saves manpower.

Figure 2:
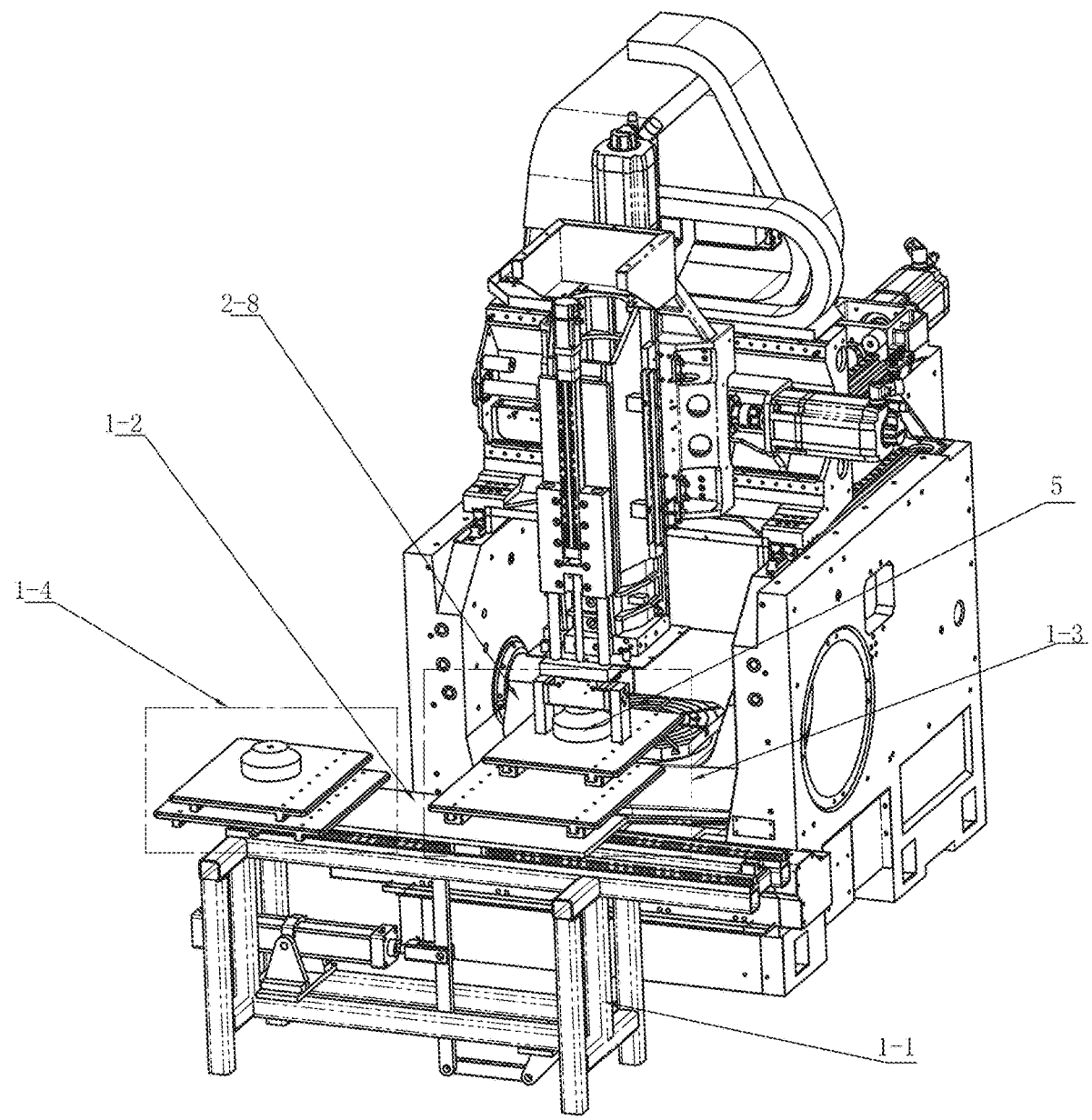
FIG. 2 is a schematic diagram of grabbing a raw material by the clamping device of the present invention.
Figure 3:
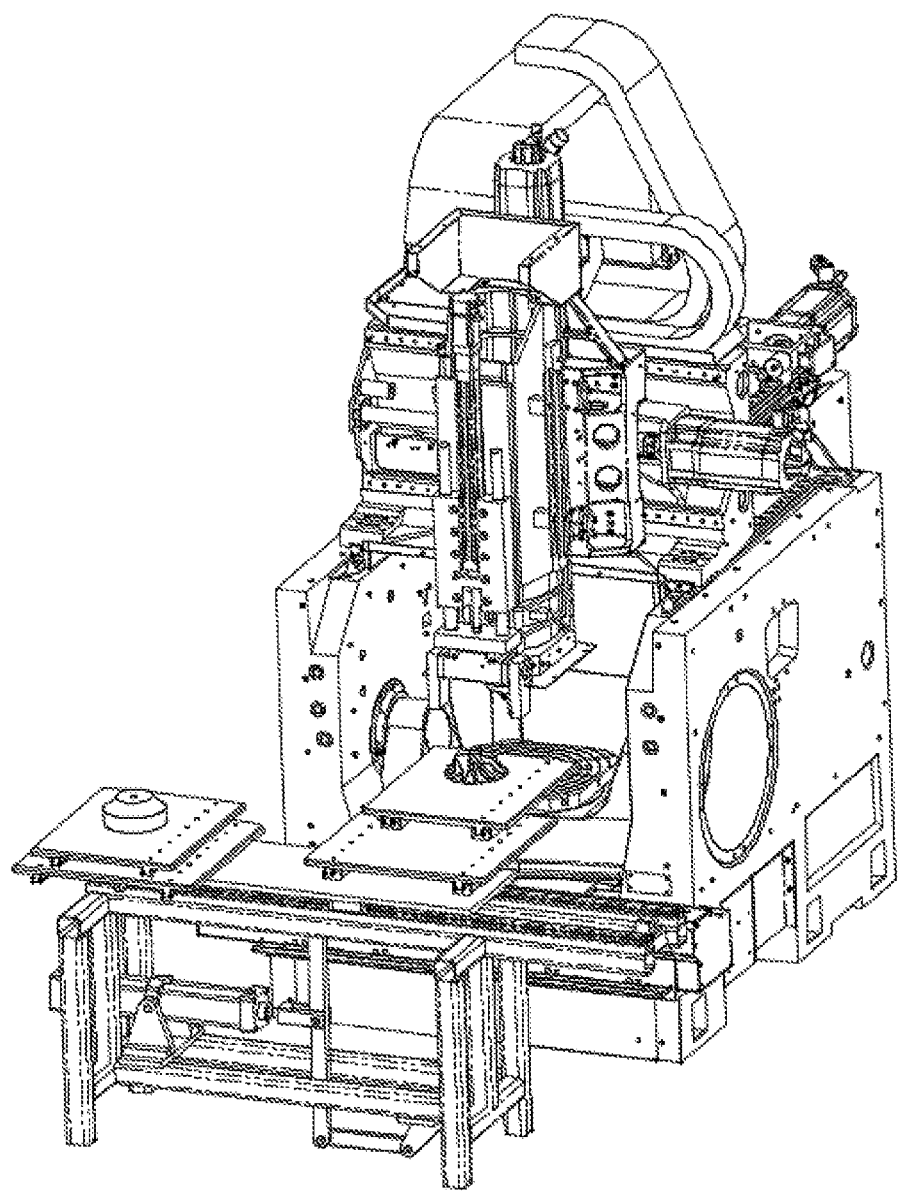
FIG. 3 is a schematic diagram of grabbing a finished part by the clamping device of the present invention.

The working process of the present invention is as follows. As shown in FIG. 1 and FIG. 2, the raw material is placed on the first pallet group 1-3 and the second pallet group 1-4, the slide table assembly 3-4 moves forward to the upper limit position on the Y axis of the numerical control machine tool, at this time, the position reached by the loading mechanism 2 is set to be point A. As shown in FIG. 2, in the initial state, the first pallet group is facing the worktable. As shown in FIG. 7 and FIG. 8, each pallet group is driven by a miniature cylinder 1-15, 1-16, which makes the two pallets of the first pallet group move forward, so that the raw material on the pallet reaches the bottom of point A. At this time, the electric motor 2-1 of the loading mechanism 2 works, so that the piston cylinder 2-3 pushes the piston rod 2-6 to move downward and then push the clamping device 2-8 (the specific structure used in the figure is pneumatic fingers) to move downward to clamp the raw material, and after the pneumatic fingers grab the raw material, the electric motor 2-1 starts again, pulls the pneumatic fingers to a specified height (just leave the pallet surface), and then the first pallet group 1-3 is reset. At this time, the slide table assembly 3-4 moves backward to point B (the position above the worktable), so that the pneumatic fingers are concentric with the turntable 3-1 in the turntable assembly. Then, the electric motor 2-1 starts again to unload the raw material on the turntable 3-1 of the numerical control machine tool, then the raw material is automatically positioned and clamped by the turntable 3-1. Then, the loading mechanism 2 is reset, and at this time, the door of the numerical control machine tool is closed, and the numerical control machine tool processes the raw material. After the processing is completed, as shown in FIG. 3, the turntable 3-1 releases the processed finished part, the door of the numerical control machine tool is opened, the slide table assembly 3-4 moves to point B, the electric motor 2-1 in the loading mechanism 2 starts, and the pneumatic fingers move down to grab the finished part, and then the pneumatic fingers rise to a specified height. At this time, the first pallet group moves to point A, and the slide table assembly moves forward to make the feeding assembly reach point A. The electric motor 2-1 in the loading mechanism 2 starts, the pneumatic fingers place the finished part on the pallet, and the pneumatic fingers and the pallet are reset. Next, the cylinder 1-14 installed under the feeding mechanism is activated, the connecting plate 1-2 is moved to the right so that the second pallet group 1-4 faces the worktable, and then the previous series of actions are repeated again.

Figure 5:
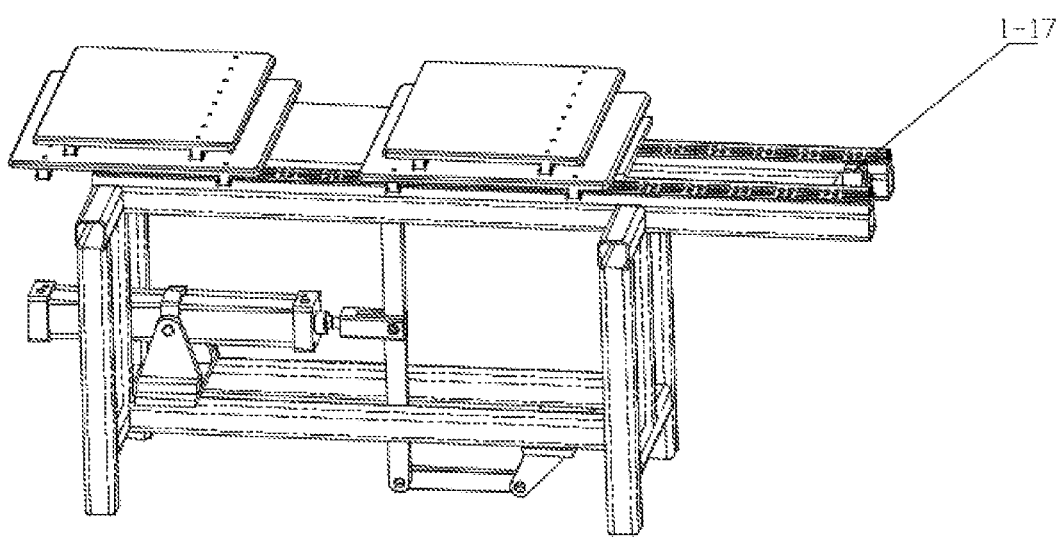
FIG. 5 is the structure schematic diagram of the initial state of the feeding mechanism of the present invention.

As shown in FIG. 5 and FIG. 6, in order to ensure the predetermined stroke of the connecting plate 1-2 and make the connecting plate 1-2 reach the preset position accurately, a limiter 1-17 is set on the base 1-1.

Finally, it should be noted that the above embodiments are only used to illustrate the technical solutions of the present invention, but not to limit them. Although the present invention has been described in detail with reference to the foregoing embodiments, a person skilled in the art should understand that the technical solutions described in the foregoing embodiments can be further modified, or some or all of the technical features thereof can be equivalently substituted. However, these modifications or substitutions do not make the essence of the corresponding technical solutions deviate from the scope of the technical solutions of the embodiments of the present invention.

The invention claimed is:

1. A five-axis vertical machining system with automatic loading and unloading of a raw material to be machined, comprising:
   a feeding mechanism;
   a loading mechanism; and
   a numerical control machine tool,
   wherein the feeding mechanism is arranged in front of a ram assembly, and the feeding mechanism drives the raw material to move along a left-right X axis and front-back Y axis of the numerical control machine tool;
   wherein the feeding mechanism includes a first pallet group for supporting the raw material, and the feeding mechanism also includes a base, a connecting plate, and a driving device;
   wherein the base is provided with the connecting plate, and the first pallet group is slidably provided on the connecting plate;
   wherein the driving device is a first cylinder;
   wherein the first cylinder drives the connecting plate and the first pallet group to move along the X axis of the numerical control machine tool, the first pallet group is arranged on the connecting plate, a second cylinder is arranged below the first pallet group, and the second cylinder drives the first pallet group to slide along the Y axis of the numerical control machine tool;
   wherein the loading mechanism is fixed on the ram assembly; and
   wherein the loading mechanism moves along a Z axis transverse to the X-and Y-axes of the numerical control machine tool and is configured to move the raw material from the feeding mechanism to a cradle assembly of the numerical control machine tool.

2. The five-axis vertical machining system with automatic loading and unloading according to claim 1, wherein the loading mechanism includes an electric motor, a mounting plate, a piston cylinder, a piston rod, and a clamping device;
   the piston cylinder is fixed on the mounting plate, the mounting plate is arranged on the ram assembly, and an output end of the electric motor faces downward and is connected to an input end of the piston cylinder; and an end of the piston rod is fixedly connected to the clamping device, and a top portion of the clamping device is connected to a bottom portion of a transition plate.

3. The five-axis vertical machining system with automatic loading and unloading according to claim 2, the loading mechanism further comprising: linear bearings; a fixed plate; and the transition plate,
   wherein the fixed plate is fixed on the mounting plate, and each of the linear bearings is arranged in a respective circular track, wherein one of the circular tracks is provided on one side of the fixed plate, and wherein another of the circular tracks is provided on an opposite side of the fixed plate,
   wherein bottom ends of the linear bearings are connected to a top portion of the transition plate, and the piston rod moves in a through hole that is between the circular tracks.

4. The five-axis vertical machining system with automatic loading and unloading according to claim 1, wherein the feeding mechanism includes a linkage mechanism;
   wherein the first cylinder is provided on a bottom portion of the base, the linkage mechanism is a guide rail and a slider, the slider is arranged on a bottom portion of the connecting plate, and the guide rail is arranged on the base;
   wherein the slider moves on the guide rail; and
   wherein the first cylinder drives the slider to move along the X axis of the numerical control machine tool.

5. The five-axis vertical machining system with automatic loading and unloading according to claim 4, further comprising: a second pallet group,
   wherein the second pallet group is arranged on the connecting plate, a third cylinder is arranged below the second pallet group, and the third cylinder drives the second pallet group to slide along the Y axis of the numerical control machine tool.

\* \* \* \* \*